US010205831B1

(12) United States Patent
Yan et al.

(10) Patent No.: US 10,205,831 B1
(45) Date of Patent: Feb. 12, 2019

(54) CHARGING INTERFACE BETWEEN SMF AND CHARGING SERVER IN NEXT GENERATION WIRELESS NETWORKS

(71) Applicant: Verizon Patent and Licensing Inc., Arlington, VA (US)

(72) Inventors: Lixia Yan, Basking Ridge, NJ (US); Marc Chiaverini, Randolph, NJ (US); Barry F. Hoffner, Bridgewater, NJ (US); Ho Yin Cheuk, Hoboken, NJ (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/824,330

(22) Filed: Nov. 28, 2017

(51) Int. Cl.
*H04W 4/24* (2018.01)
*H04W 8/18* (2009.01)
*H04W 4/26* (2009.01)
*H04M 15/00* (2006.01)

(52) U.S. Cl.
CPC ......... *H04M 15/61* (2013.01); *H04M 15/852* (2013.01); *H04W 4/24* (2013.01); *H04W 8/183* (2013.01)

(58) Field of Classification Search
CPC ...... H04M 15/61; H04M 15/62; H04M 15/58; H04M 15/59; H04M 15/852; H04M 15/853; H04W 4/24; H04W 4/26; H04W 8/183; H04W 8/186; H04W 8/18
USPC ................................................. 455/405, 406
See application file for complete search history.

(56) References Cited

U.S. PATENT DOCUMENTS

| 9,167,104 | B2* | 10/2015 | Dabbiere | H04M 15/885 |
| 9,203,629 | B2* | 12/2015 | Momtahan | G06Q 30/00 |
| 9,497,611 | B2* | 11/2016 | McNamee | H04L 12/1407 |
| 9,723,153 | B2* | 8/2017 | Garg | H04M 15/41 |
| 9,894,560 | B2* | 2/2018 | Li | H04L 12/1407 |
| 2010/0017506 | A1* | 1/2010 | Fadell | H04M 15/00 709/224 |
| 2011/0151831 | A1* | 6/2011 | Pattabiraman | H04L 12/14 455/405 |
| 2012/0329425 | A1* | 12/2012 | Velusamy | H04M 15/43 455/406 |
| 2013/0196615 | A1* | 8/2013 | Zalmanovitch | H04L 43/045 455/405 |
| 2014/0087688 | A1* | 3/2014 | Chiu | H04M 15/43 455/406 |

(Continued)

*Primary Examiner* — Julio R Perez (57) ABSTRACT

A system described herein may provide an interface between a Session Management Function ("SMF") and a charging system in a wireless telecommunications system. The charging system may generate triggers which cause the SMF to monitor traffic associated with user equipment ("UE") and alert the charging system when certain trigger conditions have been satisfied. The triggers may be modified during a communication session between the UE and the wireless telecommunications system. The triggers may be configured on a per-subscriber or a per-price plan level basis. The SMF may also cache a number of satisfied trigger conditions before notifying the charging system, which may result in an efficient use of networking and/or processing resources. The unification of "offline" and "online" charging events, by virtue of the interface, may also result in an efficient use of networking and/or processing resources.

20 Claims, 6 Drawing Sheets

(56) References Cited

U.S. PATENT DOCUMENTS

2015/0215974 A1* 7/2015 Cloutier ............... H04W 76/10
                                                           455/405

* cited by examiner

CHARGING INTERFACE BETWEEN SMF AND CHARGING SERVER IN NEXT GENERATION WIRELESS NETWORKS

BACKGROUND

Wireless telecommunications networks (e.g., Long-Term Evolution ("LTE") networks) typically utilize multiple systems and corresponding interfaces for charging functions. For instance, one system (e.g., an Offline Charging System ("OFCS")) may track subscribers' usage for the purpose of billing, generating statistics, and/or other functions that are not considered "real time" functions. On the other hand, another system (e.g., an Online Charging System ("OCS")) may facilitate the "real time" tracking of subscribers' usage, which may be useful in alerting subscribers (e.g., in scenarios where a particular subscriber is approaching his or her allotted voice call minutes or data, etc.) and/or performing other "real time" charging functions. These systems may each have various interfaces with elements of an LTE network, such as a Serving Gateway ("SGW"), Packet Data Network ("PDN") Gateway ("PGW"), and/or one or more other elements.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide for the use of a single system, along with corresponding single interface, for the use of both online (e.g., "real time") and offline (e.g., not "real time") charging record generation in a telecommunications network (e.g., a Third Generation ("3G") network, a Fourth Generation ("4G") network, a Long-Term Evolution ("LTE") network, or a Fifth Generation ("5G") network). For example, as described herein, a Next Generation Charging System ("NGCS") and a Next Generation Charging ("NGCH") interface may be used to track subscriber usage and provide alerts in real time (e.g., to alert a user that he or she is approaching a limit or has exceeded a limit associated with his or her subscription), as well as to generate information that can be used for tracking usage or analysis purposes.

Figure 1A:
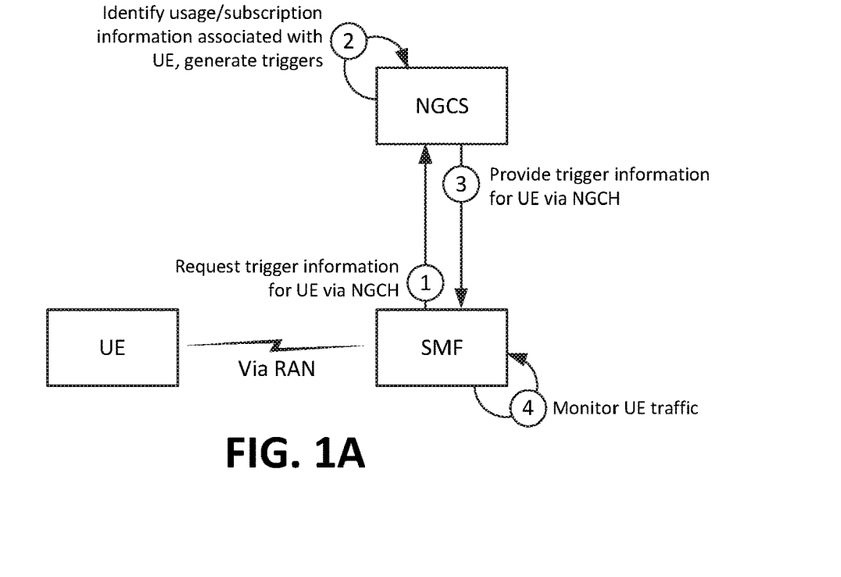
FIGS. 1A and 1B illustrate an overview of one or more embodiments described herein.

For example, as shown in FIG. 1A, a UE may communicate with a Session Management Function ("SMF"), of a wireless telecommunications network, such as a 5G wireless telecommunications network (hereinafter "5G network"), via an access network (e.g., a radio access network ("RAN")). Upon detecting that the UE has requested a communication session with the 5G network, the SMF may request (at arrow "1") trigger information from an NGCS via an NGCH interface, in accordance with some embodiments. As described in more detail below, the NGCH interface may be an interface via which the SMF and the NGCS can communicate, in order to facilitate the "real time" and non-"real time" charging functionality of the NGCS. As also described in more detail below, the trigger information may describe the types of information that should be reported to the NGCS from the SMF (via the NGCH interface), as well as a manner in which the information should be reported (e.g., whether the information should be provided in "real time" or not necessarily in "real time").

The NGCS may have previously been configured to store subscription information associated with the UE, such as information relating to usage caps (e.g., a monthly allotment of voice call minutes, data usage, text messages, etc.). As described below, the NGCS may also maintain usage information associated with the UE, which may be used in conjunction with the subscription information in order to generate triggers (at arrow "2").

For example, as shown in FIG. 1A, the NGCS may generate one or more triggers based on analyzing the subscription and usage information for a UE when the SMF requests trigger information associated with the UE. The NGCS may provide (at arrow "3") the trigger information to the SMF via the NGCH interface. As further shown, the SMF may (e.g., once a session has been established with the UE) monitor (at arrow "4") traffic (e.g., voice traffic, data traffic, text messaging traffic, etc.) sent to and/or received from the UE. For example, the SMF may monitor an amount of data sent to and/or received from the UE, a quantity of minutes that the UE participates in voice calls, a quantity of text (e.g., Short Message Service ("SMS") and/or Multimedia Messaging Service ("MMS")) messages sent to and/or received from the UE, etc.

Figure 1B:
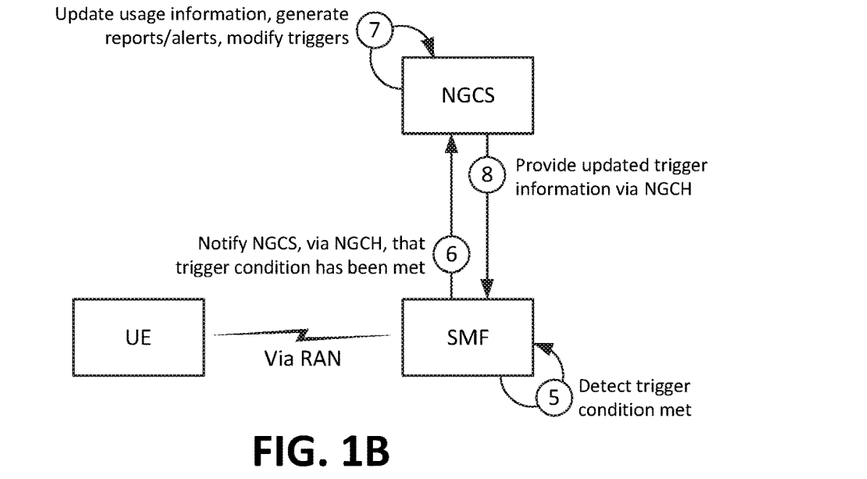

As shown in FIG. 1B, the SMF may, at some point and as a result of the monitoring of the traffic associated with the UE, determine (at arrow "5") that a particular trigger condition has been met. For example, the SMF may determine that an amount of data, consumed (e.g., sent and/or received) by the UE, during a current subscription period (e.g., a current month, a current billing cycle, etc.), has been exceeded, or is close to being exceeded. Based on this determination, the SMF may output (at arrow "6") a notification, via the NGCH interface, to the NGCS, indicating that the trigger condition associated with the UE has been met. The SMF may, in some embodiments, cache information indicating that several trigger conditions have been met, and may output (at arrow "6") the cached information, regarding multiple trigger conditions having been met. For instance, the SMF may output the cached information after a certain quantity of trigger conditions have been met, may output the cached information on a periodic basis (e.g., every hour, every six hours, etc.), and/or on some other basis. In some embodiments, some triggers may include information specifying that they should be reported to the NGCS immediately, without waiting for information regarding other triggers to be cached.

Based on receiving the notification, the NGCS may perform (at arrow "7") one or more functions. For example, the NGCS may update usage information associated with the UE. Continuing with the example discussed above, in which the amount of data consumed by the UE has been exceeded, the NGCS may update the usage information associated with the UE to indicate the amount of data consumed by the UE during the current subscription period (i.e., that the data consumed has exceeded the allotted amount of data specified by the subscription information associated with the UE).

As another example, the NGCS may generate a report and/or an alert, indicating that the UE's data consumption has exceeded the amount specified by the subscription associated with the UE. The NGCS may, in some embodiments, output (not shown) the report and/or alert to one or more other systems and/or devices (e.g., via a Transmission Control Protocol ("TCP")/Internet Protocol ("IP") communication and/or some other type of communication). For instance, the NGCS may output an alert to a messaging system, which may in turn notify the UE that the UE has exceeded the amount of data specified by the subscription associated with the UE. As another example, the NGCS may output a report or alert to an administrator console associated with the network. An administrator associated with the network may use the report or alert for analytics information (e.g., to monitor UEs that have exceeded their allotted data), to automatically raise the data cap associated with the UE, to notify a subscriber associated with the UE that the data cap has been exceeded, and/or to perform other suitable functions.

As yet another example, the NGCS may modify one or more triggers associated with the UE, and/or may add additional triggers. For instance, in some embodiments, the NGCS may receive (not shown) information from an external device or system that indicates that the subscription has been modified (e.g., additional data has been added to the subscription). Based on this information, the NGCS may modify the previously discussed trigger to reflect the additional data that has been added (e.g., may adjust a trigger condition to indicate that an alert should be generated when the new data cap has been exceeded, or is close to being reached). The NGCS may output (at arrow "8") the updated trigger(s) to the SMF via the NGCH interface. The SMF may continue monitoring the traffic associated with the UE to detect whether one or more conditions associated with the updated trigger(s) have been met.

Figure 2:
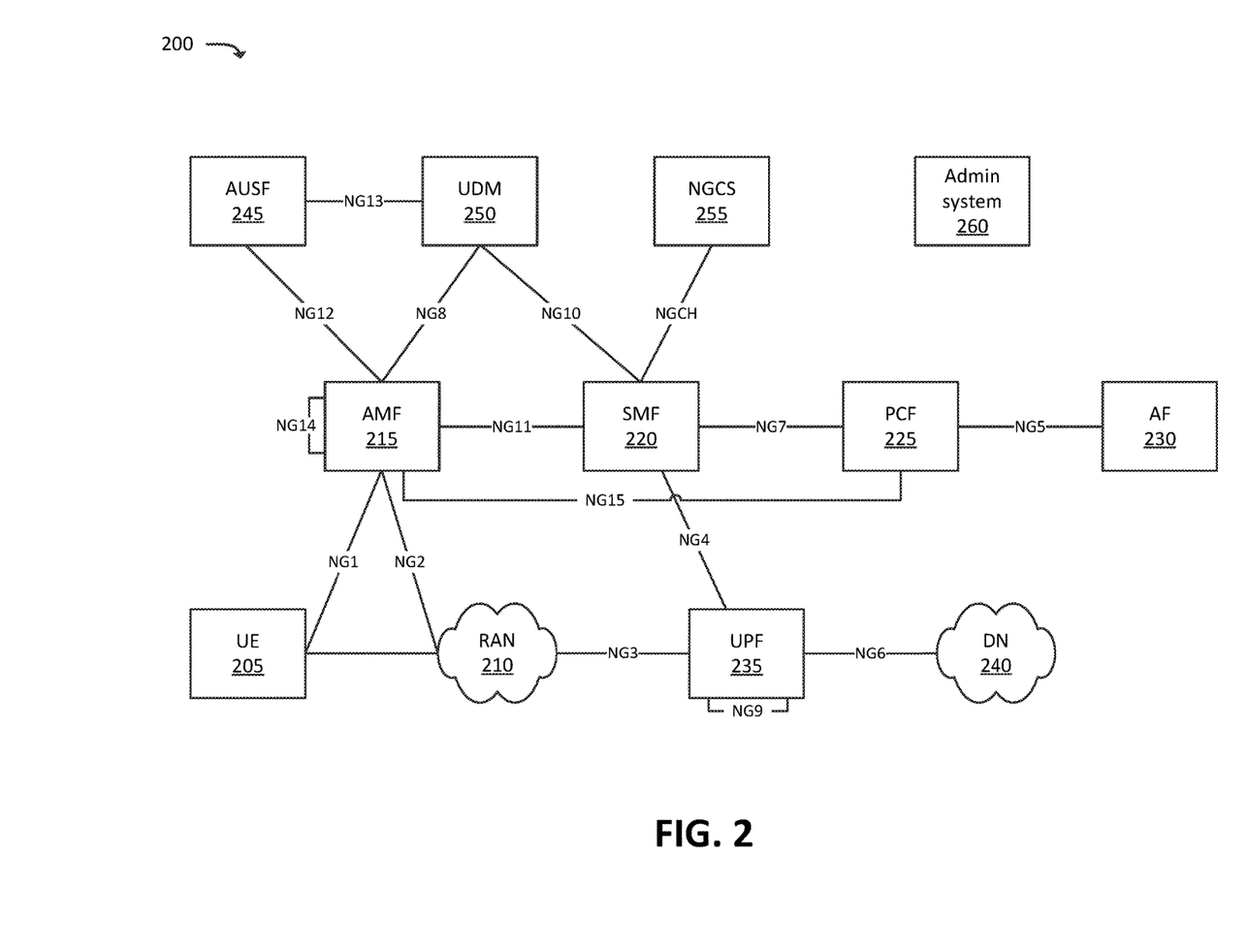
FIG. 2 illustrates an example environment in which one or more embodiments, described herein, may be implemented.

FIG. 2 illustrates an example environment 200, in which one or more embodiments, described herein, may be implemented. Generally speaking, environment 200 may be a 5G network, and/or may include elements of a 5G network. The representation shown in FIG. 2 may be a reference point representation of the 5G network, in which the interactions between various network functions are shown. These interactions are represented here as interfaces NG1 through NG15, and NGCH. It may be possible to represent environment 200 in other ways (e.g., a service-based representation), but these other representations are not provided herein for the sake of brevity.

As shown in FIG. 2, environment 200 may include UE 205, RAN 210, Access and Mobility Management Function ("AMF") 215, SMF 220, Policy Control Function ("PCF") 225, Application Function ("AF") 230, User Plane Function ("UPF") 235, Data Network ("DN") 240, Authentication Server Function ("AUSF") 245, Unified Data Management ("UDM") 250, NGCS 255, and administration system 260.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

UE 205 may include any computation and communication device that is capable of communicating with one or more networks (e.g., RAN 210 and/or DN 240). For example, user device 205 may include a device that receives content, such as web pages (e.g., that include text content and/or image content), streaming audio and/or video content, and/or other content, via an Internet connection and/or via some other delivery technique. In some implementations, user device 205 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

RAN 210 may be, or may include, a 5G RAN that includes one or more base stations, via which UE 205 may communicate with one or more other elements of environment 200. UE 205 may communicate with the RAN via an air interface. For instance, RAN 210 may receive traffic (e.g., voice call traffic, data traffic, messaging traffic, signaling traffic, etc.) from UE 205 via the air interface, and may communicate the traffic to AMF 215, UPF 235, and/or one or more other devices or networks. Similarly, RAN 210 may receive traffic intended for UE 205 (e.g., from AMF 215, UPF 235, and/or one or more other devices or networks) and may communicate the traffic to UE 205 via the air interface.

AMF 215 may include one or more computation and communication devices that perform operations to register UE 205 with the 5G network, to establish bearer channels associated with a session with UE 205, to hand off UE 205 from the 5G network to another network, to hand off UE 205 from the other network to the 5G network, and/or to perform other operations. In some embodiments, the 5G network may include multiple AMFs 215, which communicate with each other via the NG14 interface (denoted in FIG. 2 by the line marked "NG14" originating and terminating at AMF 215).

SMF 220 may include one or more network devices that gather, process, store, and/or provide information in a manner described herein. SMF 220 may, for example, facilitate in the establishment of communication sessions on behalf of UE 205. In some embodiments, the establishment of communications sessions may be performed in accordance with one or more policies provided by PCF 225. As described herein, SMF 220 may also monitor parameters associated with traffic sent to and/or received from UE 205. For instance, SMF 220 may monitor resources consumed by UE 205 (e.g., voice call minutes used by UE 205, amounts of data sent and/or received by UE 205, quantities of messages (e.g., SMS, MMS, and/or other types of messages) sent and/or received by UE 205, or the like. SMF 220 may perform the monitoring by, for example, communicating with UPF 235 (e.g., via the NG4 interface) regarding user plane data that has been processed by UPF 235.

As described herein, SMF 220 may receive triggers from 255, which may include trigger conditions that relate to usage associated with UE 205. Based on monitoring traffic associated with UE 205, SMF 220 may determine whether trigger conditions have been satisfied, and may communicate the satisfaction of trigger conditions to NGCS 255 via the NGCH interface. In some embodiments, SMF 220 may cache satisfied trigger conditions (e.g., in lieu of reporting the satisfaction of trigger conditions to NGCS 255 immediately).

PCF 225 may include one or more devices that aggregate information to and from the 5G network and/or other sources. PCF 225 may receive information regarding policies and/or subscriptions from one or more sources, such as subscriber databases and/or from one or more users (such as, for example, an administrator associated with PCF 225).

AF 230 may include one or more devices that receive, store, and/or provide information that may be used in determining parameters (e.g., quality of service parameters, charging parameters, or the like) for certain applications. AF 230 may maintain the information on a per-application basis, in some embodiments.

UPF 235 may include one or more devices that receive, store, and/or provide data (e.g., user plane data). For example, UPF 235 may receive user plane data (e.g., voice call traffic, data traffic, etc.), destined for UE 205, from DN 240, and may forward the user plane data toward UE 205 (e.g., via RAN 210, SMF 220, and/or one or more other devices). In some embodiments, multiple UPFs 235 may be deployed (e.g., in different geographical locations), and the delivery of content to UE 210 may be coordinated via the NG9 interface (e.g., as denoted in FIG. 2 by the line marked "NG9" originating and terminating at UPF 235). Similarly, UPF 235 may receive traffic from UE 210 (e.g., via RAN 210, SMF 220, and/or one or more other devices), and may forward the traffic toward DN 240. In some embodiments, UPF 235 may communicate (e.g., via the NG4 interface) with SMF 220, regarding user plane data processed by UPF 235. As mentioned above, this information may aid SMF 220 in monitoring the traffic for particular subscribers.

DN 240 may include one or more wired and/or wireless networks. For example, DN 240 may include an Internet Protocol ("IP")-based PDN, a wide area network ("WAN") such as the Internet, a private enterprise network, and/or one or more other networks. UE 205 may communicate, through DN 240, with data servers, application servers, other UEs 205, and/or to other servers or applications that are coupled to DN 240. DN 240 may be connected to one or more other networks, such as a public switched telephone network ("PSTN"), a public land mobile network ("PLMN"), and/or another network. DN 240 may be connected to one or more devices, such as content providers, applications, web servers, and/or other devices, with which UE 205 may communicate.

AUSF 245 and UDM 250 may include one or more devices that manage, update, and/or store, in one or more memory devices associated with AUSF 245 and/or UDM 350, profile information associated with a subscriber. AUSF 245 and/or UDM 350 may perform authentication, authorization, and/or accounting operations associated with the subscriber and/or a communication session with UE 205.

NGCS 255 may include one or more devices that perform one or more functions described herein. For example, NGCS 255 may store information relating to subscriptions of one or more subscribers associated with one or more UEs 205. The information for a particular subscriber may be relevant to charging and/or alert generation for the particular subscriber, such as information relating to an amount of data that the subscriber has paid for and/or is otherwise entitled to, an amount of data remaining on a data plan (e.g., a monthly data plan), a quantity of voice call minutes that the subscriber has paid for and/or is otherwise entitled to, a quantity of voice call minutes remaining on a voice call plan (e.g., a monthly voice call plan), a quantity of messages (e.g., SMS, MMS, or the like) that the subscriber has paid for and/or is otherwise entitled to, a quantity of messages remaining on a messaging plan (e.g., a monthly messaging plan), and/or other suitable information. In some embodiments, NGCS 255 may receive subscription information from administrative system 260 and/or some other source.

NGCS 255 may also, in some embodiments, generate triggers for execution by one or more other devices (e.g., SMF 220). A "trigger," as discussed herein, may include (1) a trigger condition, (2) one or more actions, and (3) a caching parameter. The trigger condition may indicate when a particular trigger is considered as "satisfied," and the action specifies a particular action that should be performed when the trigger has been satisfied. The caching parameter may generally relate to how "urgent" the trigger is, in that the caching parameter may indicate a manner in which information regarding a satisfied trigger should be reported (e.g., to administrative system 260).

As an example of a particular trigger, an example trigger condition may indicate that the trigger condition is satisfied when a subscriber's data usage has reached 90% of his/her data cap, and the action may include notifying the subscriber (e.g., by voice message, by emailing the subscriber and/or outputting an SMS message to a particular UE 205 associated with the subscriber) that the subscriber is approaching his/her data cap. The cache parameter may indicate that the alert should not be cached, and should be sent immediately to NGCS 255. In some embodiments, for such alerts (e.g., alerts for which the cache parameter indicates that the alert should not be cached), NGC 255 may immediately (e.g., within a threshold period of time, such as within one second, within one minute, etc.) notify the subscriber and/or some other system or device regarding the alert.

As another example of a particular trigger, an example trigger condition may indicate that the trigger condition is satisfied when the subscriber's voice call minutes have exceeded 50% of his/her allotted minutes, and the action may include generating information that may be used in a report (which may be eventually provided to, for example, an administrator associated with the 5G network). The cache parameter may indicate that the report may be cached indefinitely (e.g., SMF 220 may output the report at a time that is determined by SMF 220), and/or may specify a maximum amount of time that may pass before the report is output by SMF 220. As another example, the cache parameter may specify that once a specific quantity of alerts and/or reports have been cached by SMF 220, all cached alerts and/or reports should be outputted by SMF 220 to their intended destinations (e.g., to NGCS 255 and/or some other device or system).

In some embodiments, NGCS 255 may generate triggers for a particular UE 205 when the UE 205 initially requests a connection to the 5G network (e.g., when SMF 220 receives a connection request from UE 205). As another example, NGCS 255 may generate triggers for a particular UE 205 when subscription information, associated with UE 205, is received (e.g., from an administrator associated with the 5G network), which may occur independently of (e.g., before, or after) UE 205 requesting a connection with the 5G network.

Administrative system 260 may include one or more devices (e.g., a server device, a collection of server devices, a workstation computer, etc.) that receive and process information as described herein. For example, administrative system 260 may provide subscription and/or charging information to NGCS 255, which NGCS 255 may use to generate triggers for execution by, for example, SMF 220. Administrative system 260 may also receive reports and/or alerts from SMF 220 and/or NGCS 255 regarding satisfied trigger conditions. Administrative system 260 may forward alerts and/or reports to one or more other devices, such as to a particular UE 205 to which an alert pertains. Administrative system 260 may communicate with UE 205 (and/or one or more other devices) via DN 240, and/or via one or more components of the 5G network (e.g., via UPF 235, RAN 210, etc.).

Figure 3:
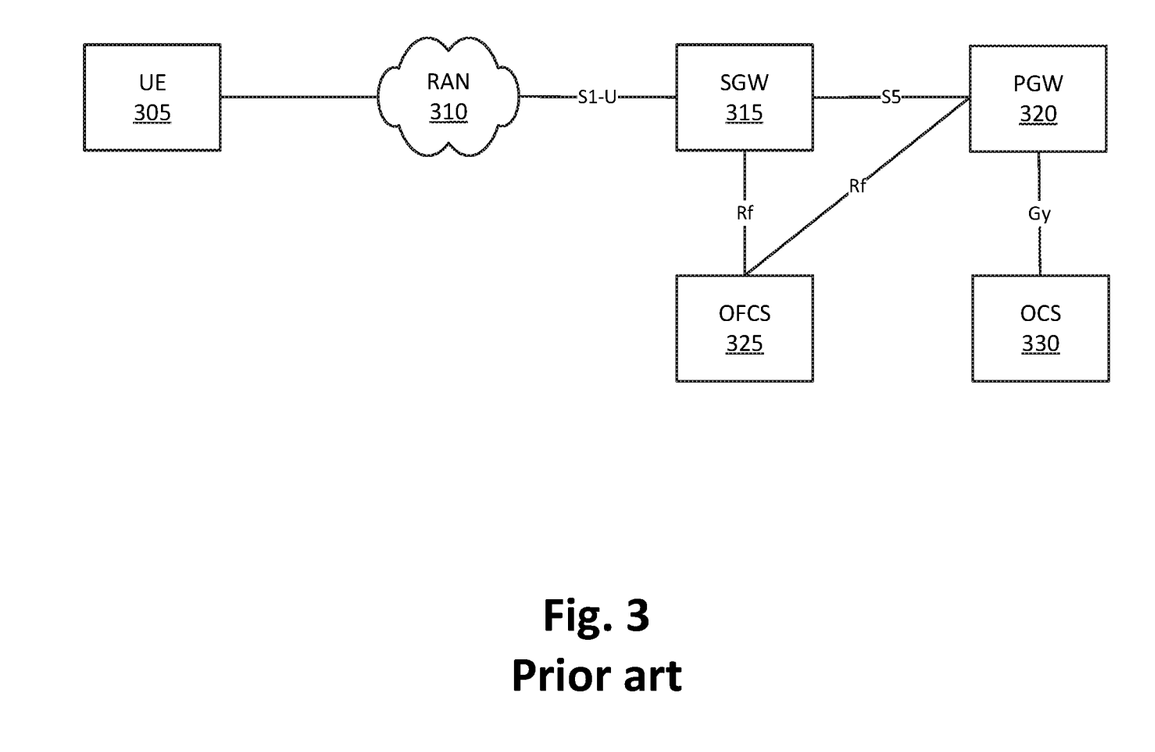
FIG. 3 illustrates an implementation of an OFCS and an OCS in an LTE network, along with corresponding interfaces with various elements of the LTE network.

FIG. 3 illustrates an example environment 300, which may correspond to a portion of a typical LTE network. As shown, environment 300 may include UE 305, RAN 310, SGW 315, PGW 320, OFCS 325, and OCS 330.

RAN 310 may offer a wireless interface for UE 305 (which may be, for example, a mobile telephone or similar device that is configured to communicate with the LTE network). SGW 315 and PGW 320 may operate to allow user plane and/or control plane traffic to be sent to and/or received from UE 305. SGW 315 and PGW 320 may also communicate with OFCS 325 via an Rf interface. SGW 315 and/or PGW 320 may provide information to OFCS 325, which may be used for charging functions that are considered not "real time" (e.g., providing usage information that can be used by OFCS 325 to track monthly usage, generate monthly bills, etc.). PGW 320 may provide information to OCS 330 (via a Gy interface), which may be used for charging functions that may be considered "real time" (e.g., alerting UE 305 that usage associated with 305 has exceeded a subscribed amount of usage).

The multiple interfaces (i.e., the Rf interfaces and the Gy interface) may carry a relatively large and/or duplicitous amount of traffic, which may result in a relatively large amount of network and/or processing resources to be used for charging functions. Additionally, since these interfaces are generally independent of each other, the information retained by OFCS 325 and OCS 330 may be asynchronous, which may result in confusion for a subscriber. For instance, if a subscriber receives an alert (e.g., based on OCS 330 determining that the subscriber's usage has been exceeded), the subscriber may check the subscriber's usage via a web application. The web application may obtain usage information from OFCS 325, which may not necessarily have been updated with the same information provided to OCS 330, thus resulting in conflicting information for the subscriber.

Figure 4:
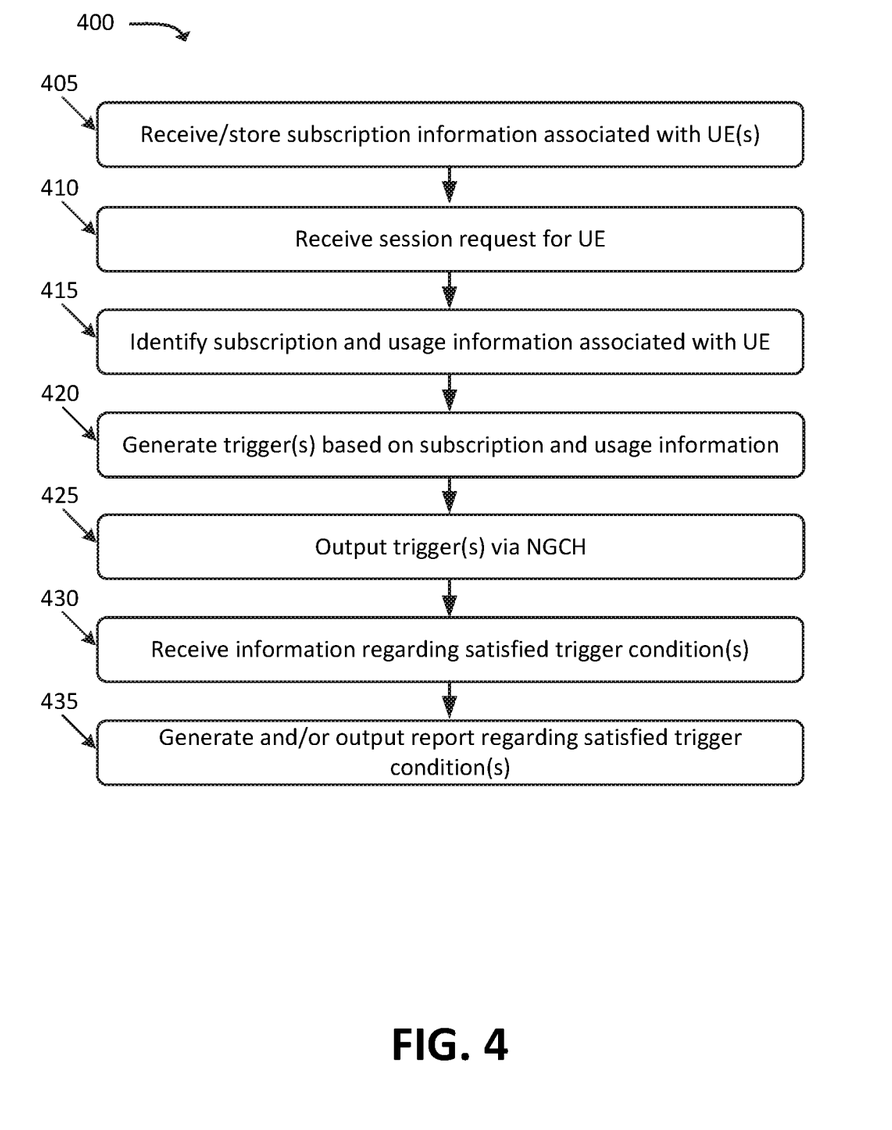
FIG. 4 illustrates an example process for generating a set of triggers for a particular User Equipment ("UE")

FIG. 4 illustrates an example process 400 for generating and outputting triggers based on subscription information associated with UE 205. In some embodiments, process 400 may be performed by NGCS 255 and/or some other device or system.

Process 400 may include receiving and storing (at 405) subscription information associated with one or more UEs. For example, NGCS 255 may receive subscription information associated with one or more UEs 205. NGCS 255 may receive the subscription information from administrative system 260 (e.g., via a TCP/IP communication and/or some other type of suitable communication), and/or from some other device or system. As discussed above, the subscription information may include, for example, information specifying limits, caps, and/or allotments regarding voice call minutes, data, messages (e.g., SMS, MMS, etc. messages), and/or other types of network usage. The subscription information, for a particular UE 205, may include identifying information regarding the particular UE 205 (e.g., a Mobile Directory Number ("MDN"), an International Mobile Subscriber Identity ("IMSI") value, an International Mobile Station Equipment Identity ("IMEI"), and/or some other type of identifier).

In some embodiments, a subscription may be associated with multiple UEs 205. In such scenarios, the subscription information may be associated with identifiers associated with each of the UEs 205 associated with the subscription. The subscription information may, in some embodiments, indicate an aggregate usage cap (e.g., an aggregate data cap, an aggregate voice call minute cap, an aggregate cap for messages, etc.) for all UEs 205 associated with the subscription. In some embodiments, the subscription information for a particular UE 205 (e.g., a UE 205 which is part of a group of UEs 205 that are associated with the same subscription) may reflect the aggregate usage cap. Thus, when considering the usage or subscription information for a particular UE 205 in the group, the aggregate usage or subscription information for the group of UEs 205 (which are associated with the same subscription) may be considered.

In some embodiments, a subscription may be associated with a group of multiple UEs 205, but may specify different caps for different UEs 205 of the group. For example, one UE 205 of the group may be a child's device, and the child's parent may set caps (e.g., using parental controls) on the amount of data that can be consumed by the child's device. Thus, when considering the usage or subscription information for the child's device, the data cap for the child's device may be the cap set via parental controls, instead of an aggregate amount of data associated with the overall subscription. Additionally, different UEs 205 in a group may have different usage caps. For instance, one UE 205 in a group may have a data cap of 5 GB per billing period, while another UE 205 in the group may have a data cap of 2 GB per billing period.

In some embodiments, NGCS 255 may also receive and/or store usage information associated with UE 205. For instance, when receiving the subscription information (at 405), NGCS 255 may also receive usage information associated with UE 205. The usage information may indicate an amount of voice minutes, data, messages, etc., that has been consumed by UE 205 (e.g., during a current subscription period). In some embodiments, UE 205 may also maintain usage information based on information received from SMF 220 (e.g., based on information received from SMF 220 regarding trigger conditions that have been satisfied, as discussed further below).

Process 400 may further include receiving (at 410) a session request for a particular UE. For example, when attempting to connect to a 5G network, UE 205 may output a request to establish a Protocol Data Unit ("PDU") session. SMF 220 may receive an indication that UE 205 has requested the PDU session, and may notify NGCS 255 regarding the request from UE 205. In some embodiments, SMF 220 may also indicate one or more identifiers associated with UE 205, such as an MDN, IMSI, IMEI, and/or other identifier associated with UE 205.

Process 400 may additionally include identifying (at 415) subscription information and usage information associated with the particular UE. For example, NGCS 255 may identify subscription and/or usage information associated with UE 205 by comparing an identifier of UE 205 included in the request (received at 410) to identifiers of UEs associated with the subscription and/or usage information (received at 405), and identifying a matching identifier for UE 205.

Process 400 may also include generating (at 420) one or more triggers based on the subscription and usage information. For example, NGCS 255 may be configured to generate triggers based on various parameters associated with the subscription associated with UE 205. For instance, NGCS 255 may be configured to generate triggers that alert UE 205 when data usage, associated with UE 205, exceeds 50%, 75%, and 90% (e.g., three distinct triggers associated with each of these thresholds) of a subscription associated with UE 205. In some embodiments, the triggers may also take into account the current usage associated with UE 205. For instance, assume that the subscription associated with UE 205 has an allotment of 10 Gigabytes ("GB") of data per subscription period, and that UE 205 has consumed (e.g., sent and/or received) 4 GB of data so far in a current subscription period. In this scenario, NGCS 255 may generate triggers with conditions indicating that actions should be performed after UE 205 consumes an additional 1 GB, 3.5 GB, and 5 GB (i.e., for a total of 5 GB (50%), 7.5 GB (75%), and 9 GB (90%), respectively). Additionally, the trigger actions may be different for each of these triggers. For instance, the action indicated by the trigger associated with the 50% threshold may include sending an email to an email address associated with UE 205 (e.g., an email address of a subscriber associated with UE 205), the action indicated by the trigger associated with the 75% threshold may include sending an SMS message, that indicates that 75% of the threshold has been reached, to UE 205, and the action indicated by the trigger associated with the 90% threshold may include sending an SMS message, that includes an offer to increase the data associated with the subscription of UE 205, to UE 205.

In some embodiments, one or more different or additional actions may be specified by a trigger. For instance, an action may include generating a report regarding a particular trigger condition having been satisfied, where the report is eventually provided to administrative system 260 and/or some other device or system. Such a report may include, for example, an identifier of UE 205, a timestamp of when a trigger condition was satisfied, a timestamp of when the report was generated or sent to administrative system 260, an indication of what the trigger condition is, and/or other suitable information. As another example, an action may include placing a voice call to UE 205 to alert a user associated with UE 205 regarding the trigger condition having been satisfied.

The trigger(s) (generated at 420) may also include one or more cache parameters. For example, as discussed above, the cache parameters may be generally related to time constraints on when NGCS 255 should be notified regarding the satisfaction of trigger conditions. For time-sensitive trigger conditions (e.g., when a user has exceeded 100% of a particular subscription threshold, such as a data cap, a maximum quantity of call minutes, a maximum quantity of messages, etc.), the cache parameter may indicate that NGCS 255 should be notified immediately (e.g., without any intentional delay by SMF 220, and/or without waiting for a predetermined amount of time to elapse, and/or without waiting for additional trigger conditions to be satisfied). For triggers that are less time-sensitive, or not time-sensitive (e.g., triggers related to reporting data usage on an ongoing basis, such as every day, every six hours, etc.), the cache parameters may indicate that NGCS 255 should be notified on a periodic basis, after a specified quantity of satisfied triggers have been cached, or may not specify any cache parameters at all. In the latter case, SMF 220 may determine an appropriate time at which to notify NGCS 255 that the trigger has been satisfied.

While examples of triggers are provided above, similar concepts may apply to other types of triggers, trigger conditions, actions, and cache parameters not explicitly enumerated above. For example, trigger conditions may relate to voice call minutes, messages sent and/or received, and/or other types of usage. As another example, actions may include automatically adjusting a subscription (e.g., raising a cap on data or voice call usage) and/or other suitable actions.

Process 400 may further include outputting (at 425) the generated triggers via the NGCH interface. For example, NGCS 255 may output the generated triggers to SMF 220 via the NGCH interface. As described below, SMF 220 may monitor usage (e.g., data usage, voice call minute usage, messaging usage, and/or other types of usage) associated with UE 205, and may notify NGCS 255 when one or more trigger conditions have been satisfied (e.g., where the notifying may occur in accordance with the cache parameters).

Process 400 may further include receiving (at 430) information regarding one or more satisfied trigger conditions. For example, NGCS 255 may receive one or more notifications from SMF 220, via the NGCH interface, regarding trigger conditions that have been identified by SMF 220 as being satisfied.

Process 400 may additionally include generating and/or outputting (at 435) a report regarding the satisfied triggers. For example, NGCS 255 may notify administrative system 260 regarding the satisfied triggers. In some embodiments, NGCS 255 may also notify administrative system 260 regarding the actions associated with the satisfied triggers. For example, as discussed above, a particular action may include sending an SMS, MMS, email, and/or other type of message to UE 205 regarding usage of the UE 205. Administrative system 260 may use the information regarding the actions to execute the actions (e.g., to send a message to UE 205, and/or to coordinate with another device or system to send a message to UE 205). In some embodiments, NGCS 255 may itself send a message to UE 205 regarding the trigger (e.g., by coordinating with another device or system to send the message to UE 205).

Figure 5:
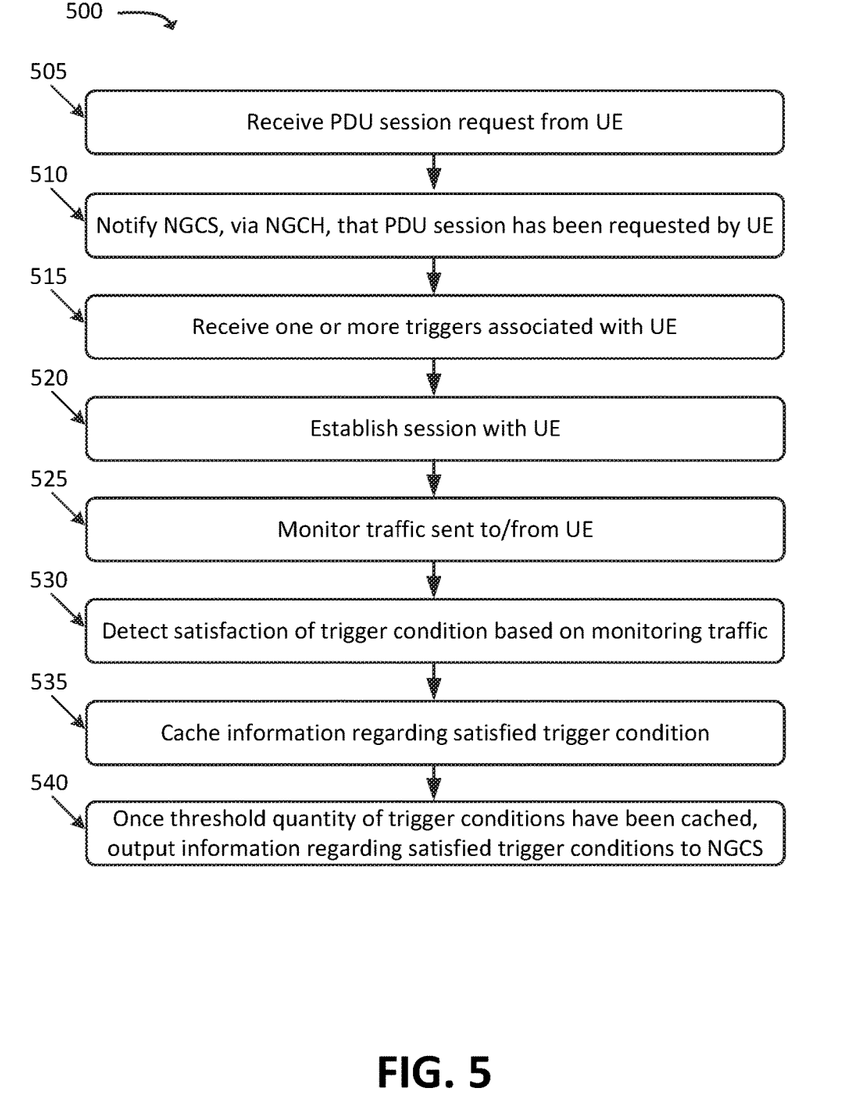
FIG. 5 illustrates an example process for monitoring the usage associated with a particular UE, including determining whether one or more trigger conditions have been satisfied.

FIG. 5 illustrates an example process 500 for monitoring traffic associated with UE 205 and alerting NGCS 255 when a trigger condition has been satisfied. In some embodiments, process 500 may be performed by SMF 220 and/or some other device or system.

As shown, process 500 may include receiving (at 505) a PDU session request from a UE. For example, SMF 220 may receive a PDU session request from UE 205 (e.g., via RAN 210 and/or AMF 215).

Process 500 may also include notifying (at 510) NGCS 255, via the NGCH interface, that the UE has requested a PDU session. For example, SMF 220 may output, via the NGCH interface, a notification to NGCS 255, indicating that UE 205 has requested a PDU session. SMF 220 may also include an identifier of UE 205, such as an MDN, an IMSI, an IMEI, and/or another suitable identifier that uniquely identifies UE 205 and/or a subscriber associated with UE 205.

Process 500 may additionally include receiving (at 515), via the NGCH interface, one or more triggers associated with the UE. For example, as described above, NGCS 255 may have generated one or more triggers associated with UE 205, based on subscription and/or usage information associated with UE 205.

Process 500 may further include establishing (at 520) a session with the UE. For example, SMF 220 may establish a session, or aid in the establishment of a session, that allows UE 205 to communicate user plane traffic (e.g., voice calls, data, messages, etc.) with the 5G network.

Process 500 may also include monitoring (at 525) traffic sent to and/or from the UE once the session has been established. For example, SMF 220 and/or another device may monitor traffic sent to and/or from UE 205. Specifically, for example, the amount of usage associated with UE 205 may be monitored (e.g., an amount of data sent to and/or received from UE 205, a quantity of voice call minutes consumed by UE 205, a quantity of SMS, MMS, etc. messages sent to and/or received by UE 205, or the like). SMF 220 may, for instance, communicate with a device or system through which the user plane traffic traverses, such as UPF 235 (e.g., via the NG4 interface), in order to monitor the amount of usage associated with UE 205.

Process 500 may additionally include detecting (at 530) the satisfaction of a particular trigger condition, based on monitoring the traffic. For example, while monitoring the traffic associated with UE 205, SMF 220 may track an amount of usage associated with UE 205 since the session was established (at 520), and compare the tracked amount to amounts specified by the trigger(s) (received at 515). For example, assume that a particular trigger indicates that an alert should be sent to NGCS 255 after UE 205 has participated in 50 minutes of voice calls. Based on the monitoring, further assume that SMF 220 determines that UE 205 has participated in 50 minutes of voice calls since the session was established. In this example scenario, SMF 220 may determine that this particular trigger condition has been satisfied.

As another example, assume that a particular trigger indicates that an alert should be sent to NGCS 255 after UE has sent 176 SMS or MMS messages. Based on the monitoring, further assume that SMF 220 determines that UE 205 has sent 176 SMS or MMS messages since the session was established. In this example scenario, SMF 220 may determine that this particular trigger condition has been satisfied.

Process 500 may further include caching (at 535) information regarding the satisfied trigger condition. For example, as discussed above, triggers may include cache parameters that indicate how long SMF 220 may wait before notifying NGCS 255 regarding satisfied cache conditions. As mentioned above, some triggers may not specify a cache condition; for such triggers, SMF 220 may be configured to determine a suitable time at which to notify NGCS 255 regarding satisfied cache conditions. For example, assume that a particular trigger does not specify a cache parameter, or specifies that SMF 220 should determine when to notify NGCS 255 when a trigger condition has been satisfied. NGCS 255 may notify NGCS 255 regarding cached trigger conditions (e.g., one or more trigger conditions which SMF 220 has determined has been satisfied) on a periodic basis (e.g., every day, every 10 hours, etc.) and/or on some other intermittent basis. For instance, SMF 220 may notify NGCS 255 when a particular quantity of satisfied trigger conditions have been cached (e.g., 10 satisfied triggers, 100 satisfied triggers, etc.). As yet another example, SMF 220 may notify NGCS 255 when network and/or processing resources are available, and/or when network and/or processing resources (associated with SMF 220 and/or NGCS 255) are below a threshold load level.

In some embodiments, the cache parameters may specify one or more similar parameters, based on which cached trigger conditions should be provided to NGCS 255. For example, a particular trigger may specify a cache parameter that dictates that NGCS 255 should be notified within a given amount of time (e.g., one hour, six hours, etc.) of a trigger condition being satisfied. As another example, a particular trigger may specify a cache parameter that dictates that NGCS 255 should be notified after a threshold quantity of satisfied triggers have been cached by SMF 220 (e.g., 10 triggers, 100 triggers, etc.). In some embodiments, a trigger's cache parameter may specify that NGCS 255 should be notified after a threshold quantity of satisfied triggers have been cached by SMF 220, and may also specify a maximum duration of time that may elapse before SMF 220 notifies NGCS 255. In this scenario, SMF 220 may notify NGCS 255 when either the quantity of cached triggers meets the threshold quantity or when the duration of time elapses, whichever occurs first.

Process 500 may also include, once a threshold quantity of trigger conditions have been cached, outputting (at 540) information regarding the satisfied trigger conditions to the NGCS, via the NGCH interface. When outputting cached triggers to NGCS 255, SMF 220 may output all cached triggers at once. For instance, assume that SMF 220 has cached a first trigger, that specifies that NGCS 255 should be notified within six hours, and has also cached a second trigger that specifies that NGCS 255 should be notified within one day. After six hours have elapsed since the caching of the first trigger, SMF 220 may notify NGCS 255 regarding both triggers, even though the full day may not have yet elapsed since the second trigger was satisfied. When notifying NGCS 255 regarding cached triggers, SMF 220 may notify NGCS 255 regarding cached triggers associated with multiple UEs 205 (e.g., all UEs 205 for which satisfied triggers have been cached), and not necessarily with one single UE 205.

In some embodiments, triggers may be organized into various classes, with each class corresponding to a different set of parameters that indicate how/when SMF 220 should notify NGCS 255 regarding satisfied trigger conditions. In some embodiments, the cache parameters may specify the class associated with a particular trigger. For example, a first class may be associated with a cache parameter that indicates that SMF 220 should notify NGCS 255 immediately regarding a satisfied trigger, a second class may be associated with a cache parameter that indicates that SMF 220 should notify NGCS 255 within two hours of a trigger condition being satisfied, and a third class may be associated with a cache parameter that indicates that SMF 220 should notify NGCS 255 after 100 satisfied triggers have been cached (e.g., 100 triggers associated with the third class, or 100 cached triggers overall).

In some embodiments, SMF 220 may notify NGCS 255 of triggers of different classes independently. For example, after two hours have expired since a particular trigger of the second class has been cached, SMF 220 may notify NGCS 255 of all cached triggers of the second class, without necessarily notifying NGCS 255 of cached triggers associated with the third class. In some embodiments, SMF 220 may notify NGCS 255 of cached triggers associated with multiple classes (e.g., all classes, or fewer than all classes but more than one class) when notifying NGCS 255 of cached triggers associated with one class.

Figure 6:
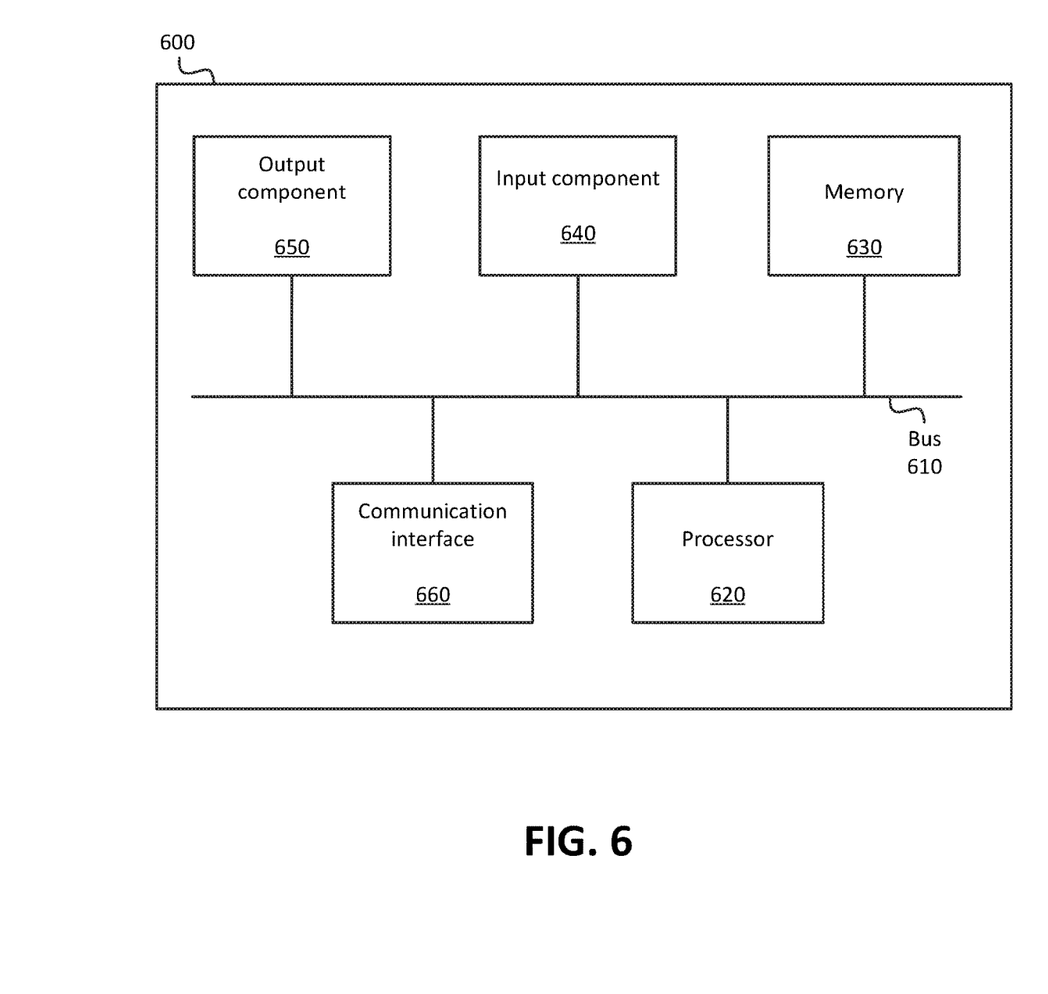
FIG. 6 illustrates example components of one or more devices, according to one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc. Input component 640 may include one or more input devices and/or sensors (e.g., input devices 305 and/or sensors 325, as described above).

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4 and 5, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device associated with a wireless telecommunications network, the device comprising:
   a non-transitory computer-readable medium storing a set of processor-executable instructions; and
   one or more processors configured to execute the set of processor-executable instructions, wherein executing the set of processor-executable instructions causes the one or more processors to:
      store subscription information regarding one or more user equipment ("UEs"), the subscription information for each UE indicating respective maximum usage amounts associated with each UE;
      receive an indication that a particular UE, of the one or more UEs, has requested a session establishment with the wireless telecommunications network;
      identify usage information associated with the particular UE, the usage information indicating an amount of usage that has been consumed by the UE;
      generate one or more triggers associated with the particular UE, wherein a particular trigger, of the one or more triggers, includes:
         a trigger condition that is based on:
            a maximum usage amount associated with the UE, as indicated by the subscription information regarding the particular UE, and
            the amount of usage that has been consumed by the UE, as indicated by the usage information, and
         a cache parameter that indicates a manner in which the device should be notified when the trigger condition has been satisfied, wherein the cache parameter specifies at least one of:
            a maximum amount of time, after the network device determines that the trigger condition has been satisfied, that the network device can cache information indicating that the trigger condition has been satisfied before notifying the device that the trigger condition has been satisfied, or
            a maximum quantity of satisfied trigger conditions that can be cached by the network device before the network device is required to notify the device that the trigger condition has been satisfied; and
      output the one or more triggers to a network device that monitors usage associated with the UE and notifies the device regarding the particular trigger condition being satisfied, in a manner that is based on the cache parameter associated with the particular trigger.

2. The device of claim 1, wherein the processor-executable instructions, to output the one or more triggers to the network device include processor-executable instructions to output the one or more triggers to a Session Management Function ("SMF") of the telecommunications network.

3. The device of claim 2, wherein the processor-executable instructions to output the one or more triggers to the SMF include processor-executable instructions to:
   output the one or more triggers to the SMF via an interface between the device and the SMF,
   wherein the processor-executable instructions further include processor-executable instructions to:
      receive a notification that the particular trigger condition was satisfied; and
      output an alert for the UE, indicating that the particular trigger condition was satisfied.

4. The device of claim 1, wherein the usage information associated with the particular UE indicates usage, associated with the particular UE, during a current subscription period.

5. The device of claim 1, wherein the usage information associated with the particular UE includes information regarding voice call usage associated with the particular UE.

6. The device of claim 1, wherein the usage information associated with the particular UE indicates an amount of data usage associated with the particular UE.

7. The device of claim 1, wherein the usage information associated with the particular UE indicates a quantity of messages sent or received by the particular UE.

8. A method performed by a device associated with a wireless telecommunications network, the method comprising:
   storing, in a non-transitory computer-readable medium associated with the device, subscription information regarding one or more user equipment ("UEs"), the subscription information for each UE indicating respective maximum usage amounts associated with each UE;
   receiving, by the device, an indication that a particular UE, of the one or more UEs, has requested a session establishment with the wireless telecommunications network;
   identifying, by the device, usage information associated with the particular UE, the usage information indicating an amount of usage that has been consumed by the UE;
   generating, by the device, one or more triggers associated with the particular UE, wherein a particular trigger, of the one or more triggers, includes:
      a trigger condition that is based on:
         a maximum usage amount associated with the UE, as indicated by the subscription information regarding the particular UE, and
         the amount of usage that has been consumed by the UE, as indicated by the usage information, and
      a cache parameter that indicates a manner in which the device should be notified when the trigger condition has been satisfied, wherein the cache parameter specifies at least one of:
         a maximum amount of time, after the network device determines that the trigger condition has been satisfied, that the network device can cache information indicating that the trigger condition has been satisfied before notifying the device that the trigger condition has been satisfied, or
         a maximum quantity of satisfied trigger conditions that can be cached by the network device before the network device is required to notify the device that the trigger condition has been satisfied; and
   outputting, by the device, the one or more triggers to a network device that monitors usage associated with the UE and notifies the device regarding the particular trigger condition being satisfied, in a manner that is based on the cache parameter associated with the particular trigger.

9. The method of claim 8, wherein outputting the one or more triggers to the network device includes outputting the one or more triggers to a Session Management Function ("SMF") of the telecommunications network.

10. The method of claim 9, wherein outputting the one or more triggers to the SMF includes:
outputting the one or more triggers to the SMF via an interface between the device and the SMF,
wherein the method further includes:
receiving a notification that the particular trigger condition was satisfied; and
outputting an alert for the UE, indicating that the particular trigger condition was satisfied.

11. The method of claim 8, wherein the usage information associated with the particular UE indicates usage, associated with the particular UE, during a current subscription period.

12. The method of claim 8, wherein the usage information associated with the particular UE includes information regarding voice call usage associated with the particular UE.

13. The method of claim 8, wherein the usage information associated with the particular UE indicates an amount of data usage associated with the particular UE.

14. The method of claim 8, wherein the usage information associated with the particular UE indicates a quantity of messages sent or received by the particular UE.

15. A non-transitory computer-readable medium, storing a set of processor-executable instructions, which, when executed by one or more processors of a device associated with a wireless telecommunications network, cause the one or more processors to:
store subscription information regarding one or more user equipment ("UEs"), the subscription information for each UE indicating respective maximum usage amounts associated with each UE;
receive an indication that a particular UE, of the one or more UEs, has requested a session establishment with the wireless telecommunications network;
identify usage information associated with the particular UE, the usage information indicating an amount of usage that has been consumed by the UE;
generate one or more triggers associated with the particular UE, wherein a particular trigger, of the one or more triggers, includes:
a trigger condition that is based on:
a maximum usage amount associated with the UE, as indicated by the subscription information regarding the particular UE, and
the amount of usage that has been consumed by the UE, as indicated by the usage information, and
a cache parameter that indicates a manner in which the device should be notified when the trigger condition has been satisfied, wherein the cache parameter specifies at least one of:
a maximum amount of time, after the network device determines that the trigger condition has been satisfied, that the network device can cache information indicating that the trigger condition has been satisfied before notifying the device that the trigger condition has been satisfied, or
a maximum quantity of satisfied trigger conditions that can be cached by the network device before the network device is required to notify the device that the trigger condition has been satisfied; and
output the one or more triggers to a network device that monitors usage associated with the UE and notifies the device regarding the particular trigger condition being satisfied, in a manner that is based on the cache parameter associated with the particular trigger.

16. The non-transitory computer-readable medium of claim 15, wherein the processor-executable instructions, to output the one or more triggers to the network device include processor-executable instructions to output the one or more triggers to a Session Management Function ("SMF") of the telecommunications network.

17. The non-transitory computer-readable medium of claim 16, wherein the processor-executable instructions to output the one or more triggers to the SMF include processor-executable instructions to:
output the one or more triggers to the SMF via an interface between the device and the SMF,
wherein the processor-executable instructions further include processor-executable instructions to:
receive a notification that the particular trigger condition was satisfied; and
output an alert for the UE, indicating that the particular trigger condition was satisfied.

18. The non-transitory computer-readable medium of claim 15, wherein the usage information associated with the particular UE indicates usage, associated with the particular UE, during a current subscription period, wherein the usage information associated with the particular UE includes information regarding voice call usage associated with the particular UE.

19. The non-transitory computer-readable medium of claim 15, wherein the usage information associated with the particular UE indicates an amount of data usage associated with the particular UE.

20. The non-transitory computer-readable medium of claim 15, wherein the usage information associated with the particular UE indicates a quantity of messages sent or received by the particular UE.

* * * * *